(12) United States Patent  
Henry

(10) Patent No.: US 7,883,121 B2
(45) Date of Patent: Feb. 8, 2011

(54) PIPE COUPLING CLAMP

(75) Inventor: John Julian Henry, Roscommon (IE)

(73) Assignee: Advanced Couplings Limited (GB)

( * ) Notice: Subject to any disclaimer, the term of this patent is extended or adjusted under 35 U.S.C. 154(b) by 1011 days.

(21) Appl. No.: 11/324,238

(22) Filed: Jan. 4, 2006

(65) Prior Publication Data

US 2006/0197344 A1 Sep. 7, 2006

(30) Foreign Application Priority Data

Feb. 18, 2005 (EP) .................................. 05394005
Oct. 7, 2005 (IE) ................................ S2005/0682

(51) Int. Cl.
*F16L 23/00* (2006.01)

(52) U.S. Cl. .................... 285/410; 285/367; 285/420

(58) Field of Classification Search ................ 285/111, 285/112, 364, 365, 366, 367, 406, 410, 420

See application file for complete search history.

(56) References Cited

U.S. PATENT DOCUMENTS

| 3,966,240 | A | * | 6/1976 | Enomoto | 285/367 |
| 5,653,481 | A | * | 8/1997 | Alderman | 285/363 |
| 5,873,611 | A | * | 2/1999 | Munley et al. | 285/367 |
| 6,030,006 | A | * | 2/2000 | Lin | 285/411 |
| 6,056,332 | A | * | 5/2000 | Foster | 285/367 |
| 6,523,866 | B2 | * | 2/2003 | Lin | 285/410 |
| 6,672,631 | B1 | | 1/2004 | Weinhold | |
| 6,755,445 | B2 | * | 6/2004 | Balamuta et al. | 285/357 |
| 7,290,805 | B2 | * | 11/2007 | Wu | 285/365 |
| 2002/0109355 | A1 | * | 8/2002 | Elliott | 285/410 |
| 2002/0185869 | A1 | | 12/2002 | Lin | |
| 2005/0258648 | A1 | * | 11/2005 | Newman | 285/364 |

FOREIGN PATENT DOCUMENTS

| DE | 19757969 A1 | | 7/1999 |
| DE | 19757969 A1 | * | 7/1999 |
| GB | 1104922 A | | 3/1968 |
| JP | 02011992 A | * | 1/1990 |

* cited by examiner

*Primary Examiner*—James M Hewitt
(74) *Attorney, Agent, or Firm*—Tutunjian & Bitetto, P.C.

(57) ABSTRACT

A pipe coupling clamp including a pair of clamp half members essentially C-shaped in cross-section each having a pipe flange receiving groove for receiving the mating flanges of two pipes to be coupled. The clamp half members being hinged together at one pair of ends by a hinge including plates and releasably connected together at the other pair of ends by a locking eyebolt and associated locking eyebolt nut hingedly connected at its proximal end to the end of one clamp half member to allow pivoting moving through a slot into an open securing jaw on the other end. The locking eyebolt includes, at its proximal end, an eyebolt seating portion connected to a stepped threaded portion of reduced diameter at its distal end. Thus, initially, on loosening of the nut, the locking eyebolt will not disengage from within the securing jaw.

17 Claims, 12 Drawing Sheets

PIPE COUPLING CLAMP

Figure 1:
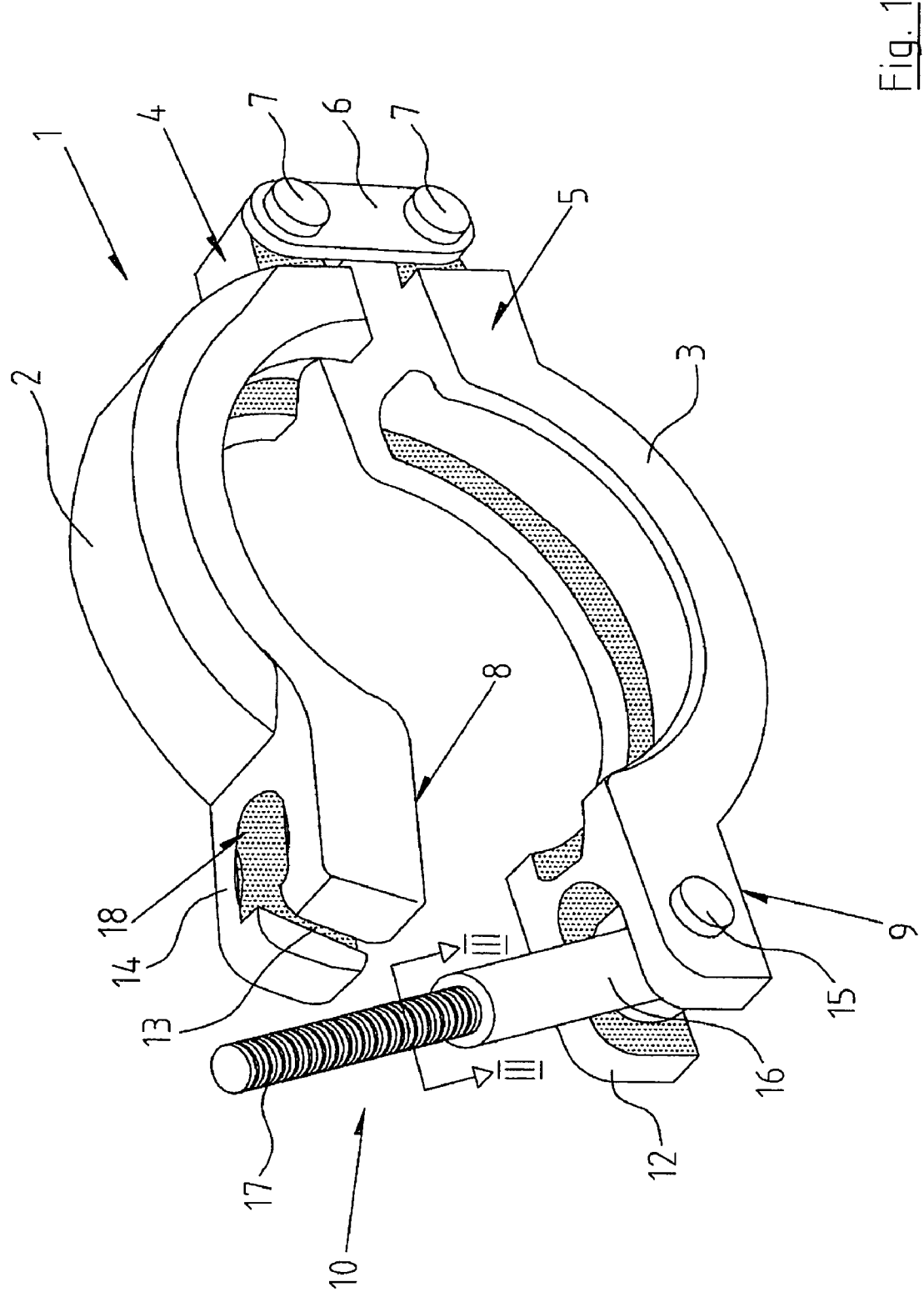

The present invention relates to a pipe coupling clamp comprising a pair of clamp halves substantially C-shaped in cross-section, and grooved to receive mating flanges of two pipes to be coupled, the clamp halves being hinged together at one pair of ends and releasably connected together at the other pair of ends by a locking eyebolt and associated nut, which locking eyebolt is hingedly connected at its proximal end within an open support jaw on the end of one clamp to allow it to pivot through a receiving slot which is connected to an open securing jaw on the end of the other clamp half.

In the pharmaceutical and food industries, it is a requirement that liquids be transported, stored and processed in sanitary conditions. It is common to use stainless steel pipes and containers with closures. The joining of such pipes and the closing of such containers is not generally done with threaded connectors or closures because of the risk of contamination due to the use of threads. Many stainless steel containers are manufactured with access ports that terminate with flange connections. It is common to connect lengths of pipe, each having a flange, together. There are many clamping mechanisms or coupling clamps used to clamp the mating flanges of two pipes or indeed of the access port of a container and a flange closure together.

Unfortunately, in certain instances, the standard and well known clamp, such as that described above, can be disengaged accidentally, for example, by somebody brushing against the nut which is usually a wing nut. Unfortunately, after the wing nut is loosened, then the whole eyebolt can pivot outwards and thus cause the two clamp halves to disengage. Sometimes, even if it is not accidentally knocked, the wing nut can unscrew over time, with much the same effect. The problem is if, for example, the pipes are transporting corrosive or very hot liquids, serious injuries can occur. It is not too bad, for example, if it is a small leak that occurs as this usually can be seen by operatives and the position rectified. However, the problem arises when the clamp totally disengages and then there can be serious consequences.

A further problem is to prevent unauthorised personnel from opening such closures or indeed disengaging such pipe ends.

Furthermore, due to the nut associated with such clamps unscrewing over time, or as a result of mishaps during installation of clamps, it is possible for the nut to accidentally become separated from the clamp, which may result in it being accidentally dropped into a vessel or an un-sanitised area of a plant room. This will normally result in costly "shut down" times. Further problems arise in relation to the use of pipes coupled by such clamps, as it is difficult for maintenance engineers to identify hazardous materials which the pipes coupled by the clamps are transporting.

It is known in the art to provide various constructions of such coupling clamps, such as, for example, that described and claimed in U.S. Pat. No. 6,056,332 (Foster). Many of these type of couplings have been designed to provide rapid action closure, such as, for example, U.S. Pat. No. 6,672,631 (Weinhold). There are further designs for which a constant clamping pressure is maintained, even under changes in temperature and changes in internal pressure behind the flange connection. A typical example of this is described in US Patent Application No. US 2002/0185869A1 (Lin). To overcome the problem of, for example, the pipes completely separating if the bolt were to fall during use, it is known to provide a safety strap, such as described in UK Patent No. 1104922 (Avica). A further type of clamp construction is described in German Patent No. 19757969 (Linnemann). This document describes a rapid action closure in conjunction with integrated clamping and release portions. These prior art configurations for clamps are however complex arrangements which are difficult to cleanly finish and are possibly not totally safe.

It is therefore an object of the present invention to provide an improved construction of pipe coupling clamp of the aforesaid type which goes someway toward overcoming at least the above problems, and/or which will provide the public and/or industry with a useful choice.

It is acknowledged that the term 'comprise' may, under varying jurisdictions be provided with either an exclusive or inclusive meaning. For the purpose of this specification, and unless otherwise noted explicitly, the term comprise shall have an inclusive meaning—i.e. that it may be taken to mean an inclusion of not only the listed components it directly references, but also other non-specified components. Accordingly, the term 'comprise' is to be attributed with as broader interpretation as possible within any given jurisdiction and this rationale should also be used when the terms 'comprised' and/or 'comprising' are used.

Further aspects of the present invention will become apparent form the ensuing description which is given by way of example only.

STATEMENTS OF INVENTION

According to the invention, there is provided a pipe coupling clamp comprising:

a pair of clamp half members substantially C-shaped in cross-section, each having a proximal end and a distal end;

a pipe flange receiving groove located on each clamp half member for receiving the mating flanges of two pipes to be coupled;

a hinge connecting the proximal ends of the clamp half members together;

a locking eyebolt and associated nut for releasably connecting the distal ends of the clamp halves together, a locking eyebolt hinge for pivotally connecting the proximal end of the locking eyebolt within an open support jaw on the distal end of one clamp half, the locking eyebolt comprising, at its proximal end, an elongate eyebolt seating portion which extends out of the open support jaw terminating in a stepped threaded portion of reduced diameter at its distal end, an eyebolt receiving slot connected to an open securing jaw located on the distal end of the other clamp half, the locking eyebolt configured to pivot through the receiving slot into the open securing jaw, the eyebolt receiving slot having a reduced size to receive the stepped threaded portion of the locking eyebolt, and the open securing jaw comprising an enlarged inner eyebolt receiving socket to snugly receive the eyebolt seating portion.

The advantage of this is that if the locking nut disengages slightly from the locking eyebolt, the clamps halves will not separate, even under pressure, and thus the coupling will remain in position preventing, in many instances, serious injury. Furthermore, as there is no requirement to mill clamp releasing recesses in the locking eyebolt the resulting clamp will be significantly stronger than prior art clamps (such as the clamp described in Linnemann), the locking eyebolt being significantly weakened by such milling. Additionally, having clamp releasing recesses milled into the locking eyebolt will also reduce the bearing surface provided by the locking eyebolt, which will also further reduce the coupling strength of the clamp. Furthermore, milling or machining recesses in the locking eyebolt will cause ragged metal fins or burring on the locking eyebolt, which burring must be removed by specialist tools in order to get a clean finish along the bolt to ensure free movement of the nut along the screw threaded portion. The provision of a locking eyebolt having an elongate eyebolt seating portion connected to a screw threaded portion which acts as a clamp release portion will eliminate the requirement for such additional finishing and eliminate the other problems described above.

Additionally, the provision of a continuous screw threaded portion on the locking eyebolt will ensure that during tightening the nut engages fully around the periphery of the locking eyebolt. This is particularly advantageous when compared to bolts having integrated recesses acting as a clamp release portion (such as is the case in the clamp described in Linnemann), as these bolts are prone to 'gauling' which causes the nut to stick to threaded portion in the recessed region on the bolt during tightening. Such 'gauling' will typically occur when dirt or some other loose object gets caught within the bolt recesses preventing the free movement of the nut along the threaded portion in the region of the bolt recesses.

In one embodiment of the invention, the locking eyebolt nut is a wing nut.

In one embodiment of the invention, the elongate eyebolt seating portion is substantially the same size as the enlarged inner socket to provide a force fit between them.

In another embodiment of the invention, the clamp further comprises a stop for preventing movement of the nut off the stepped threaded portion, which stop is secured to the free end of the stepped threaded portion of the locking eyebolt.

The advantage of this is that the clamp is assembled as a fully integrated complete component in which the nut can be loosened significantly to allow the clamp to be released and opened, but in which the stop will prevent the nut from being completely removed from the clamp. This will prevent the problem of the nut dropping into a vessel or unsanitised area of a plant room. Moreover, such a feature will also ensure that the individual components of the clamp cannot be separated which will eliminate costly "shut-down" times for retrieval of separable clamping components.

In another embodiment of the invention, the nut comprises a bore having an internal threaded portion integrally connected to a widened portion of increased size, the internal threaded portion for engaging with the stepped threaded portion and the widened portion for engaging around a portion of the inner bolt seating portion.

In another embodiment of the invention, the clamp comprises a colour coding which identifies the medium flowing through the pipes coupled by the clamp.

Preferably, the colour coding comprises a coloured plastic coating on the nut and stop. Colour coding the clamps in this way will enable maintenance engineers to identify specific hazardous materials which are transported through pipes coupled by the clamps. Such an identification system will be particularly useful for pre-warning engineers of any likely hazard areas within the plant room.

In another embodiment of the invention, the locking eyebolt nut engages the clamp half through a clamp engaging cylindrical nut receiving socket having a bored washer forming base.

In this latter embodiment, ideally the socket includes a lock receiving hole whereby a lock has to be removed to access the nut.

Again, with these latter embodiments, the nut may be a domed nut comprising a cylindrical inner portion and an outer hexagonal portion.

In one embodiment of the invention, the clamp halves are hinged together by a connector plate pivotally mounted on each clamp half.

In another embodiment, there is a pair of spaced-apart connector plates is mounted on each side of the clamp halves by pivot pins.

In another embodiment of the invention, there is provided a pipe coupling clamp comprising:
- a pair of clamp half members substantially C-shaped in cross-section, each having a proximal end and a distal end;
- a pipe flange receiving groove located on each clamp half member for receiving the mating flanges of two pipes to be coupled;
- a hinge connecting the proximal ends of the clamp half members together;
- a locking eyebolt and associated locking eyebolt nut for releasably connecting the distal ends of the clamp halves together,
- a locking eyebolt hinge for pivotally connecting the proximal end of the locking eyebolt within an open support jaw on the distal end of one clamp half, the locking eyebolt comprising, at its proximal end, an elongate eyebolt seating portion which extends out of the open support jaw terminating in a stepped threaded portion of reduced diameter at its distal end,
- the nut having a bore with an internal threaded portion integrally connected to a widened portion of increased size, the internal threaded portion for engaging with the stepped threaded portion and the widened portion for engaging around a portion of the eyebolt seating portion,
- an eyebolt receiving slot connected to an open securing jaw located on the distal end of the other clamp half, the locking eyebolt configured to pivot through the receiving slot into the open securing jaw,
- the eyebolt receiving slot having a reduced size to receive the stepped threaded portion of the locking eyebolt, and the open securing jaw comprising an enlarged inner eyebolt receiving socket to snugly receive the eyebolt seating portion.

DETAILED DESCRIPTION OF THE INVENTION

Figure 2:
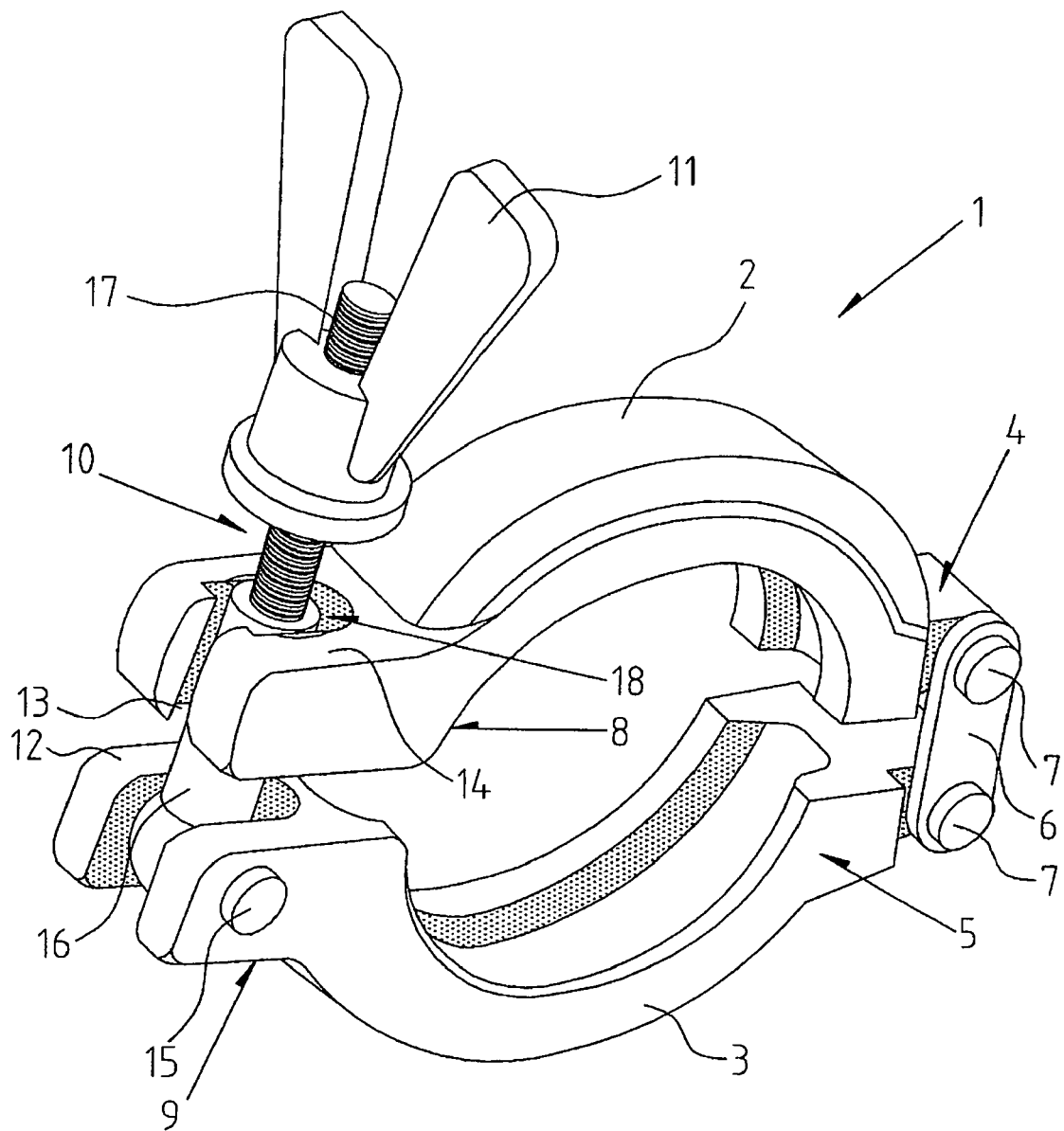
Figure 3:
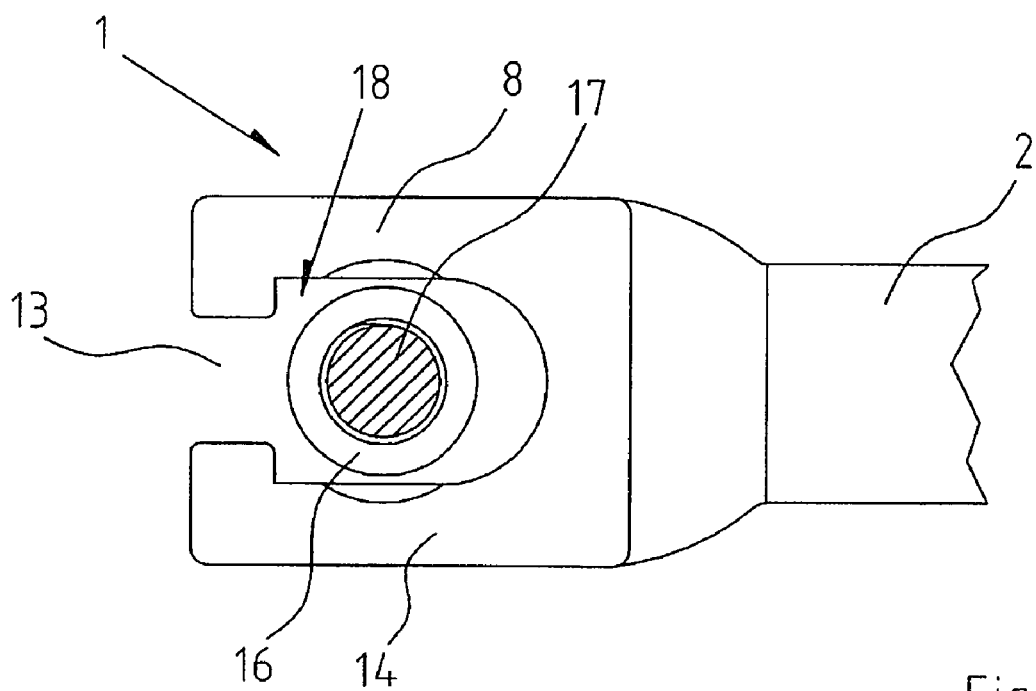
Figure 6:
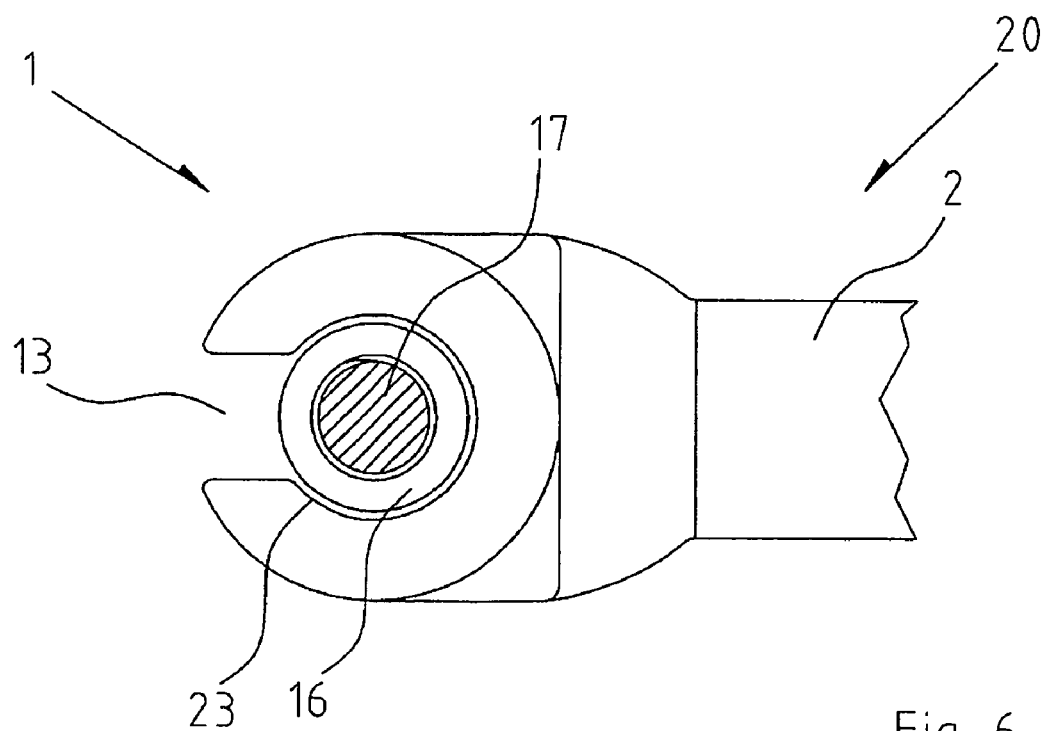
Figure 4:
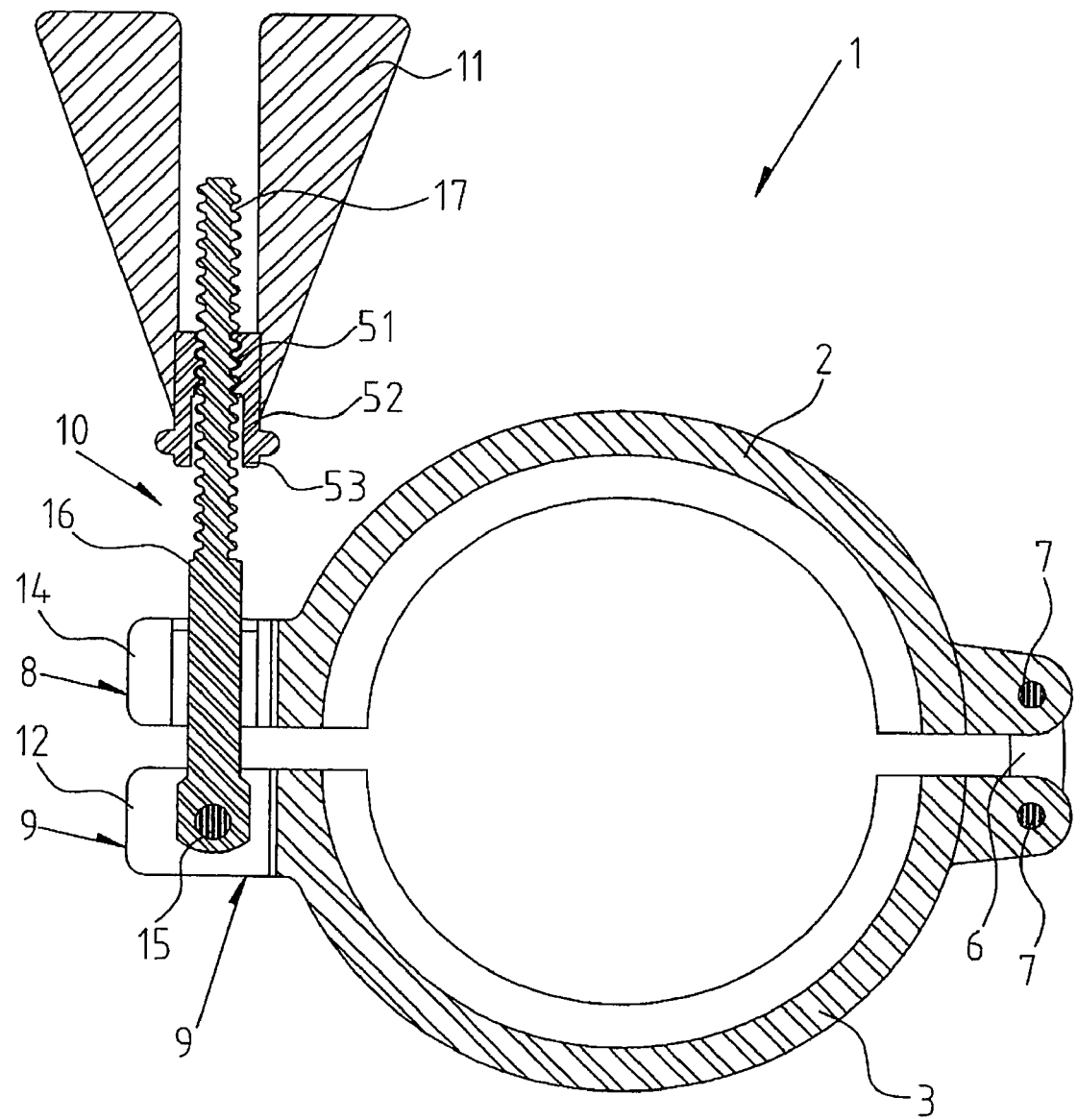
Figure 5:
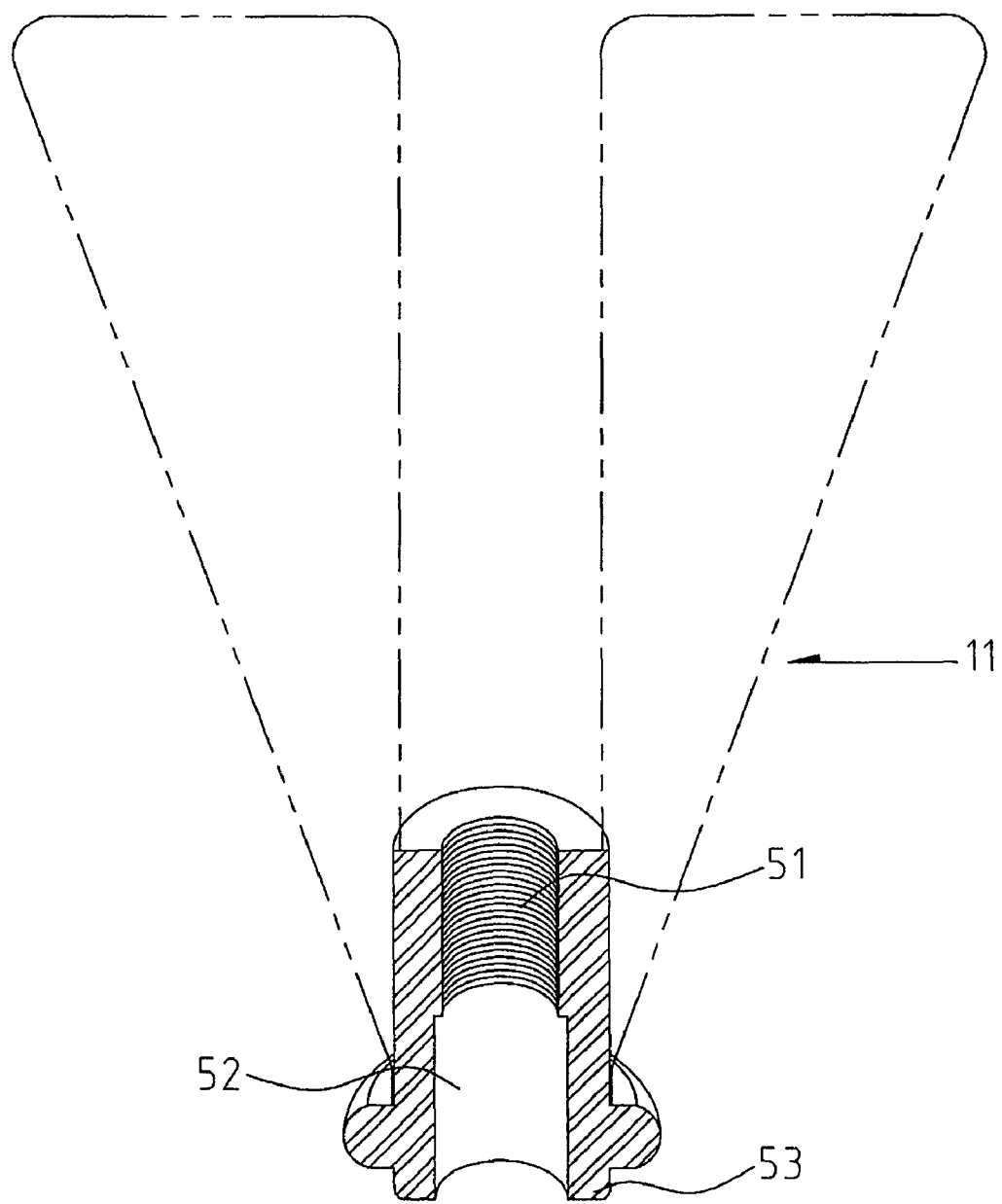
Figure 7:
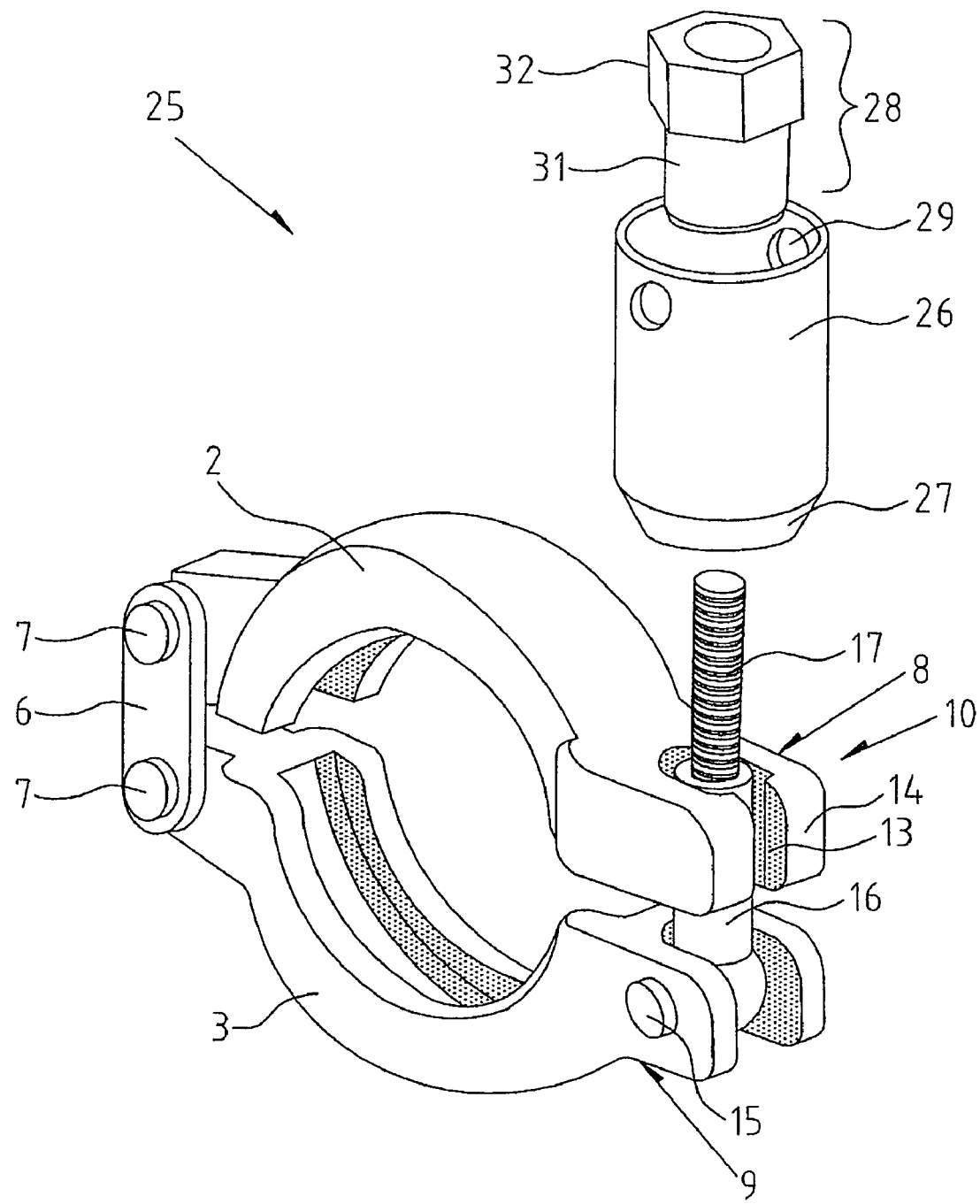
Figure 8:
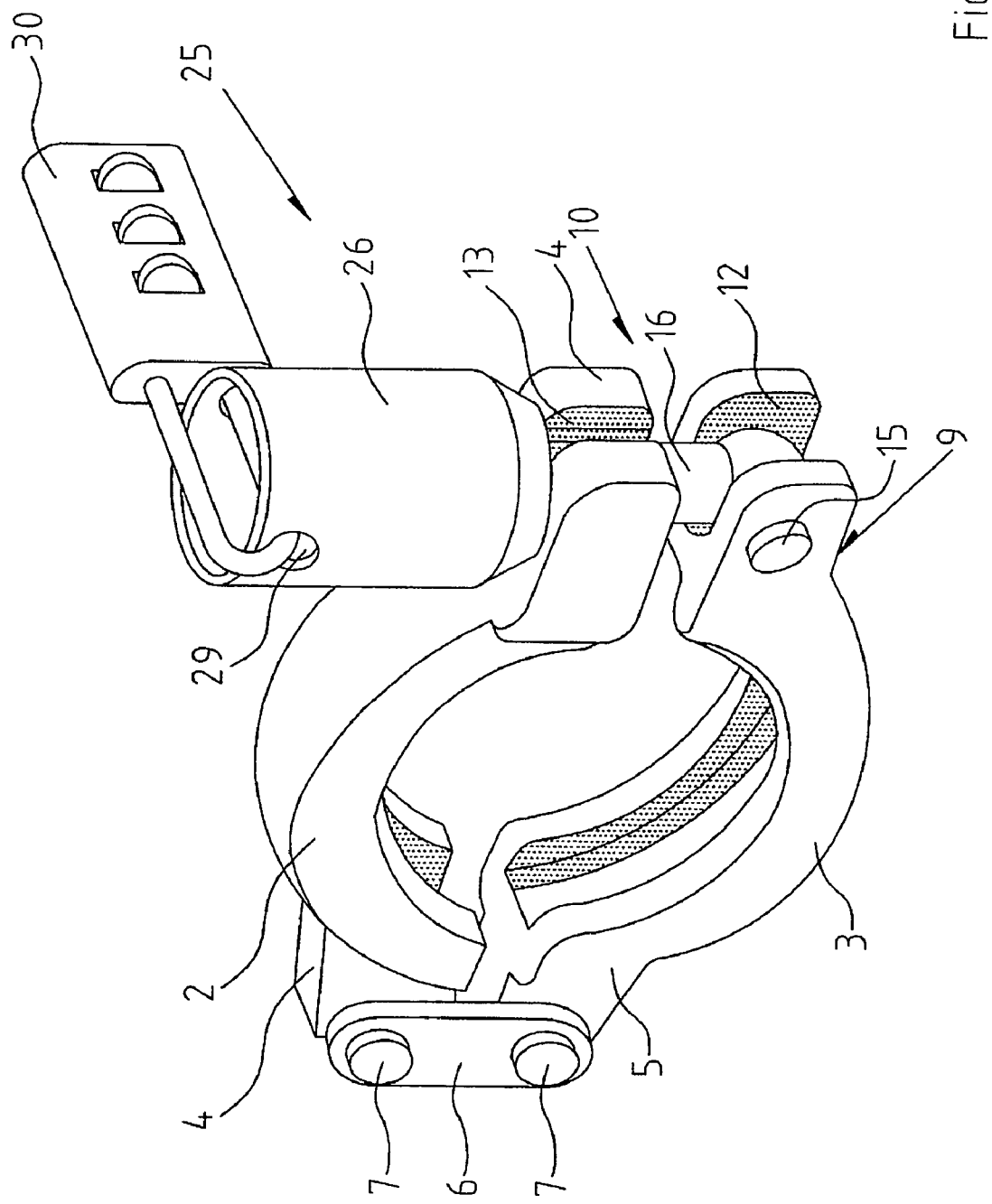
Figure 9:
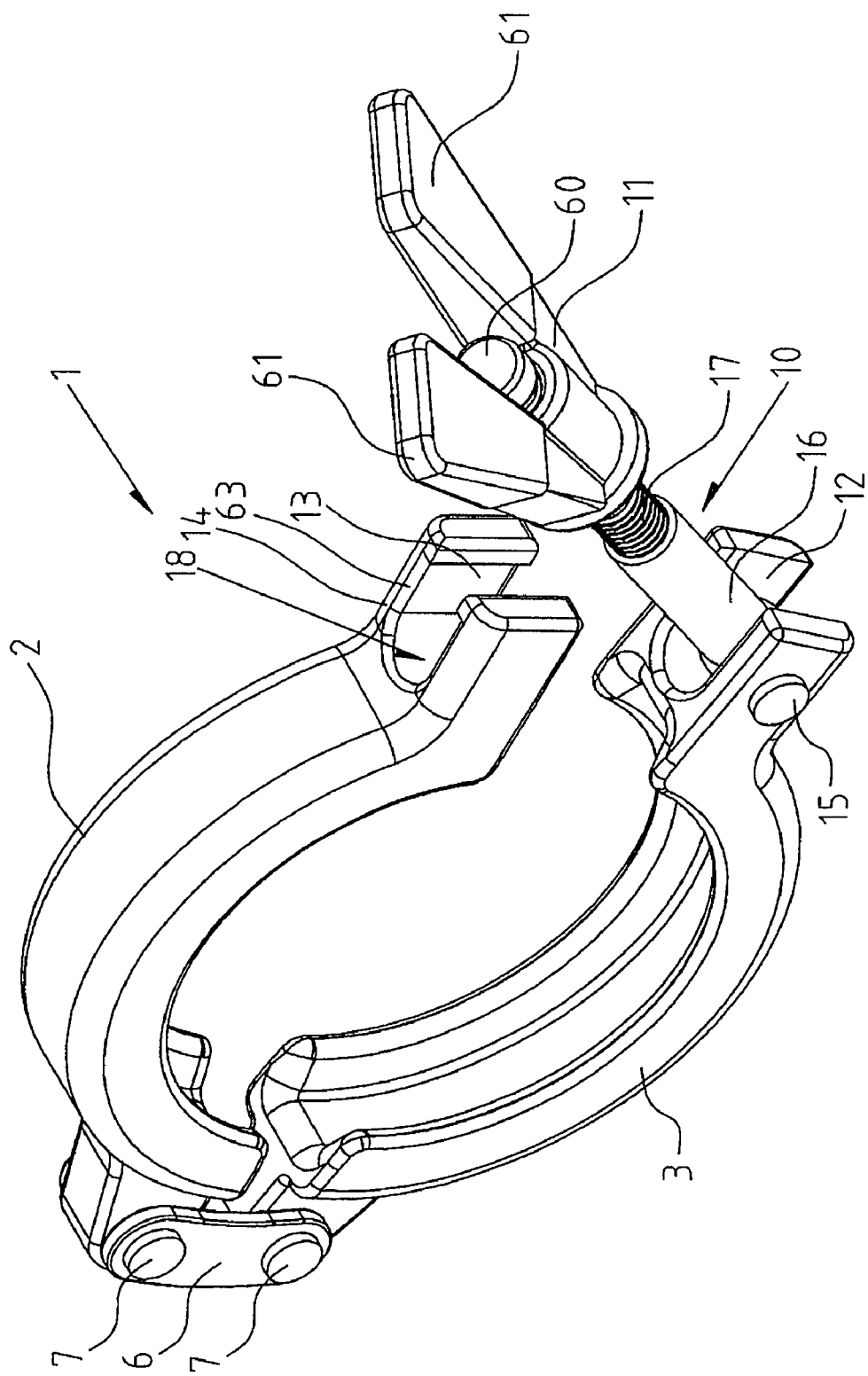
Figure 10:
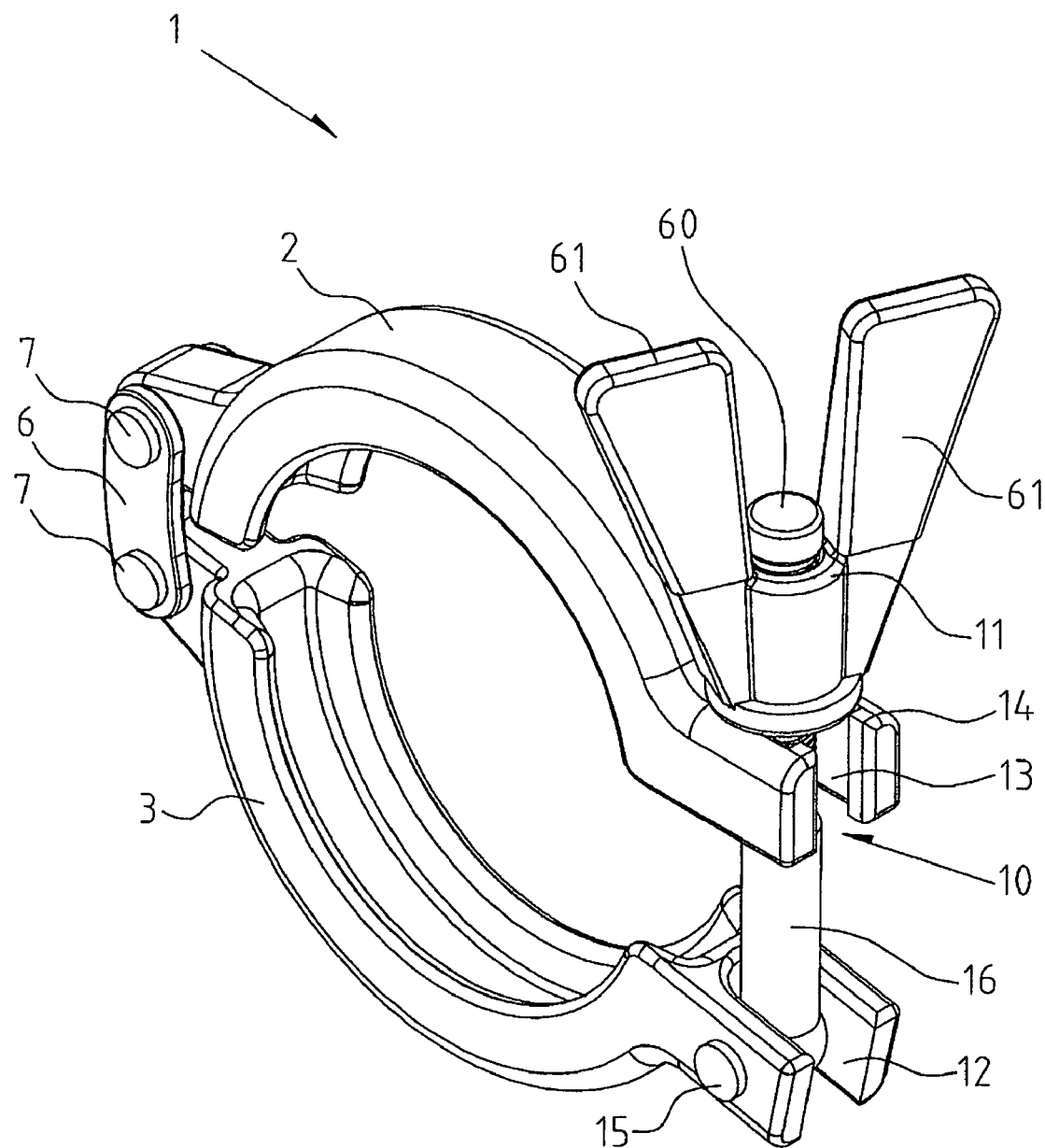
Figure 11:
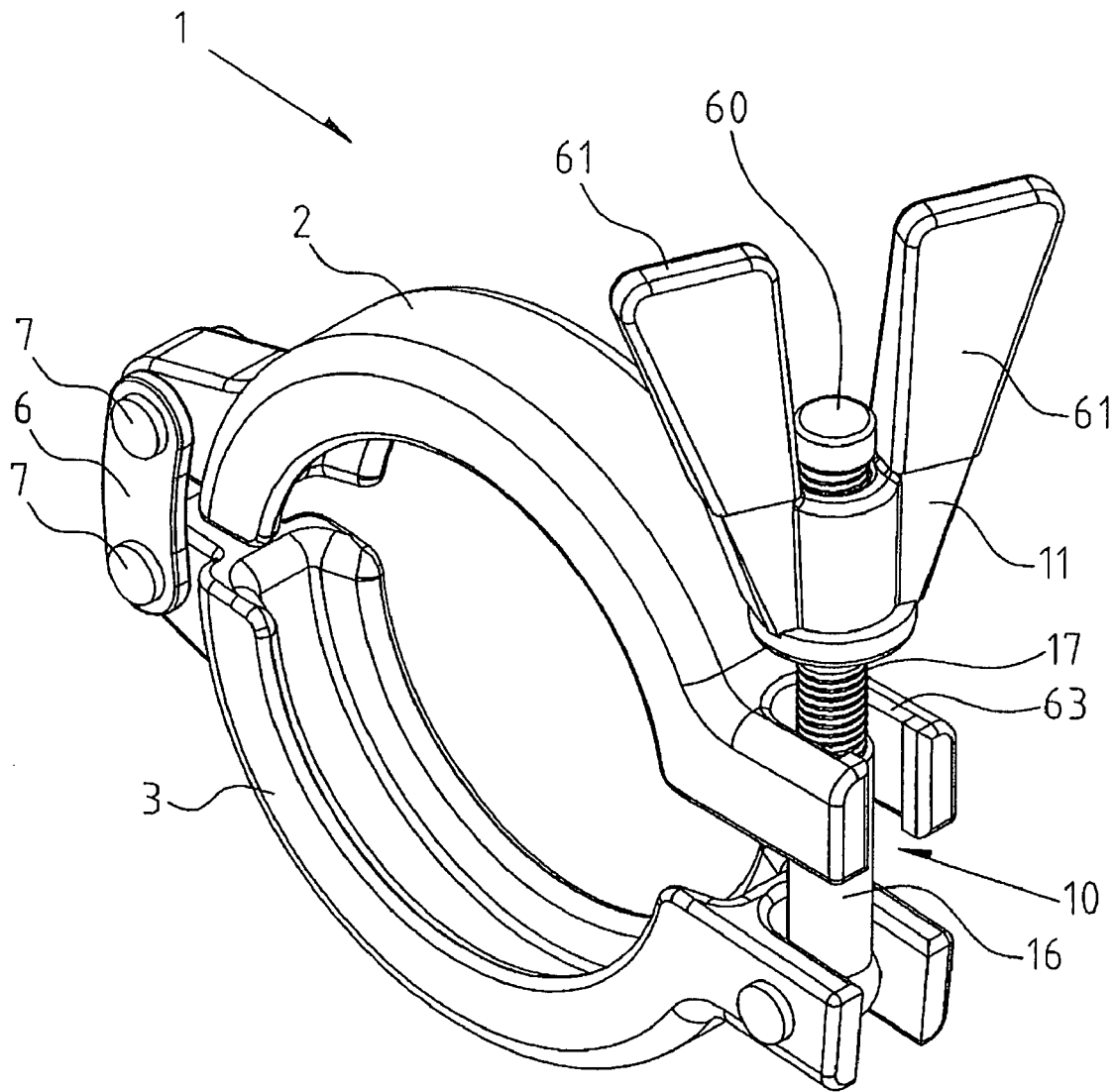
Figure 12:
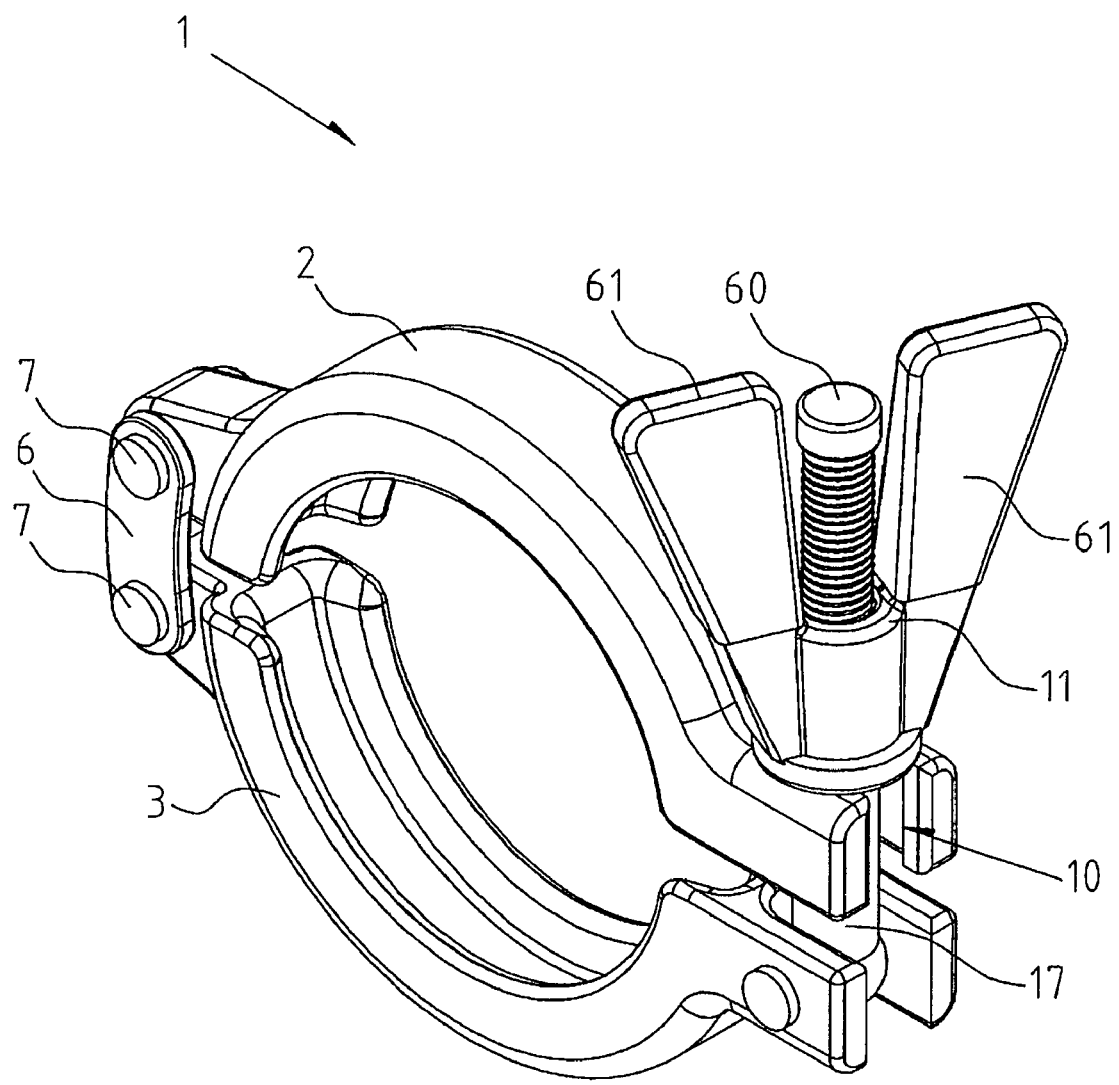
Figure 13:
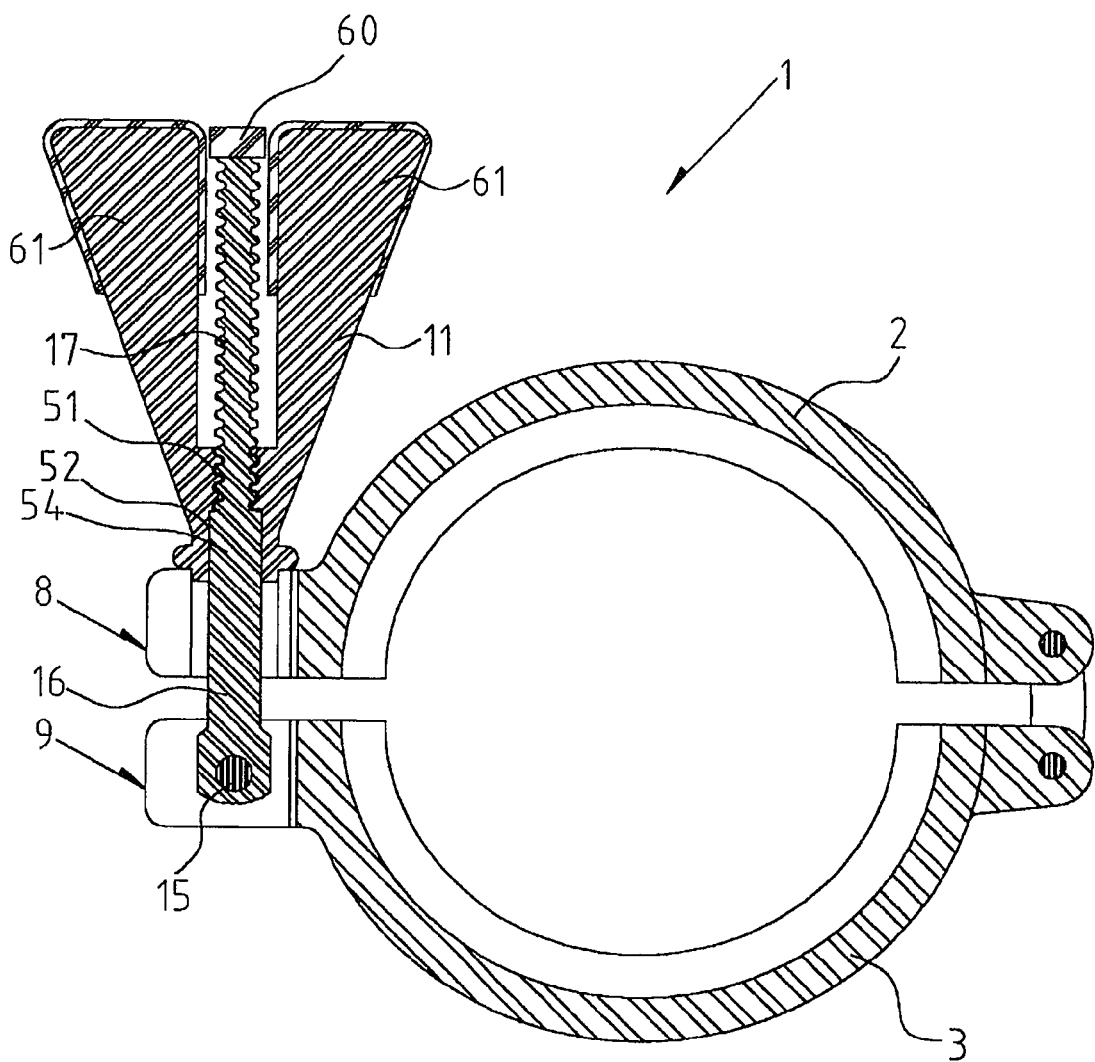

The invention will be more clearly understood from the following description of some embodiments thereof, given by way of example only, with reference to the accompanying drawings, in which:

FIG. 1 is a perspective view, partially disassembled, of a pipe coupling clamp according to the invention, FIG. 2 is a perspective view showing the clamp about to be closed, FIG. 3 is a sectional view in the direction of the arrows III-III of FIG. 1, FIG. 4 is a sectional view of the pipe coupling clamp shown in FIG. 2, FIG. 5 is a sectional view of a wing-nut used in conjunction with the pipe coupling clamp shown in FIGS. 1 to 4, FIG. 6 is a sectional view similar to FIG. 3 of an alternative construction of clamp according to the invention, FIG. 7 is an exploded view of a still further pipe coupling clamp according to the invention, FIG. 8 is a perspective view of the assembled pipe coupling clamp of FIG. 7, FIG. 9 is a perspective view of a still further pipe coupling clamp, partially disassembled, according to the invention, FIGS. 10 to 12 are perspective views showing the clamp depicted in FIG. 9 being closed, FIG. 13 is a sectional view of the pipe coupling clamp shown in FIG. 12.

Referring to the drawings and initially to FIGS. 1 to 3 thereof, there is provided a pipe coupling clamp, indicated generally by the reference numeral 1, comprising a pair of substantially C-shaped clamp half members 2, 3 hinged together at their proximal ends, indicated generally by the reference numerals 4 and 5, by a hinge comprising a pair of connector plates 6 mounted by means of pivot pins 7 on each clamp half member 2 and 3. A pipe flange receiving groove is located on each clamp half member 2, 3 for receiving the mating flanges of two pipes to be coupled. The clamp half members 2 and 3 are releasably connected together at their distal ends, indicated generally by the reference numerals 8 and 9, by a locking eyebolt, indicated generally by the reference numeral 10, and associated nut 11. The locking eyebolt 10 is connected by a locking eyebolt hinge 15 at its proximal end within an open support jaw 12 on the distal end 9 of the clamp half 3 to allow the locking eyebolt to pivot through an eyebolt receiving slot 13 into an open securing jaw 14 connected to the distal end 8 of the other clamp half member 2.

The locking eyebolt 10 comprises, at its proximal end, an elongate eyebolt seating portion 16 which extends out of the open support jaw 12 terminating in a stepped threaded portion 17 of reduced diameter as its distal end. The eyebolt receiving slot 13 is of a reduced size to receive the stepped threaded portion 17 and the securing jaw 14 comprises an enlarged inner eyebolt receiving socket indicated generally by the reference numeral 18, of a size sufficient to snugly receive the elongate eyebolt seating portion 16. This can be seen clearly from FIG. 3.

The locking eyebolt 10 is provided with an associated threaded nut, in this case a wing nut 11 (see FIG. 2). As can be seen from FIGS. 1 and 2, the distal ends 8, 9 of the clamp half members 2, 3 can only be secured together by initially passing the threaded portion 17 through the slot 13 so that it comes to rest in the enlarged inner eyebolt receiving socket 18 of the securing jaw 14. The securing jaw 14 is then moved down the locking eyebolt 10 by an operator applying a pushing force to the claim half 2 and the wing nut 11 is then tightened down until a portion of the eyebolt seating portion 16 is drawn up into the enlarged inner eyebolt receiving socket 18. With the coupling clamp 1 firmly in position, it will be appreciated that even if the wing nut 11 loosens somewhat, the clamp half members 2 and 3 will not separate. A further advantage with the construction is that it makes it relatively easy for the clamp 1 to be placed in position and held by itself as the wing nut 11 is tightened.

With reference to FIGS. 4 and 5, the wing nut 11 comprises an internal threaded portion 51 integrally connected to a widened portion 52 of increased size so that as the wing nut 11 is tightened on the locking eyebolt 10 (see FIG. 2) the internal threaded portion 51 will engage with the stepped threaded portion 17 during tightening. The widened portion 52 has a size sufficient to ensure that it does not engage with the stepped threaded portion 17 during tightening of the wing nut 11. Depending on the extent of tightening required the widened portion 52 may engage around an upper portion of the eyebolt seating portion 16.

Referring to FIG. 6, there is illustrated an alternative construction of pipe coupling clamp, indicated generally by the reference numeral 20, which pipe coupling clamp 20 has a modified form of enlarged inner eyebolt receiving socket, identified by the reference numeral 23, which has a circular cross-section. Such a configuration provides a frictional or force-fit for the locking eyebolt 10 within the socket 23. Parts similar to those described with reference to FIGS. 1 to 3 are identified by the same reference numerals.

Referring now to FIGS. 7 and 8, there is illustrated a still further construction of pipe coupling clamp, indicated generally by the reference numeral 25, in which parts similar to those described with reference to the previous drawings, are identified by the same reference numerals. In this embodiment, the locking eyebolt 10 engages a cylindrical nut receiving socket 26 having a bored washer forming base 27, into which a nut 28 projects to engage the threaded portion 17 of the locking eyebolt 10. The cylindrical nut receiving socket 26 has a pair of axially arranged through holes 29 for reception of a lock 30, as shown in FIG. 8. The nut 28 is a domed nut having a cylindrical inner portion 31 and an outer hexagonal portion 32.

The pipe coupling clamp shown in FIGS. 7 and 8 operates in exactly the same way as the pipe coupling clamp of the previous embodiments, except that now the nut 28 can be retained in position and prevented from unauthorised tampering by the lock 30.

Referring now to FIG. 9, there is illustrated a pipe coupling clamp similar to that shown in FIGS. 1 to 4, again identified by the same reference numeral 1 with parts similar to those described in FIGS. 1 to 4 already identified by the same reference numerals. In the embodiment shown, the clamp 1 further comprises a stop 60 which is secured to the free end of the stepped threaded portion 17 of the locking eyebolt 10. The size of the stop 60 is larger than the bore of the wing nut 11 so that, in use, it will prevent movement of the wing nut 11 off the stepped threaded portion 17 when the clamp 1 is disassembled or during opening.

In the instance shown, the pipe coupling clamp 1 also comprises a colour coding system for easy identification of a medium flowing through pipes coupled by the clamp 1. In the instance shown, the colour coding comprises a coloured plastic coating which, in the instance shown, is on the stop 60 and on the wings 61 of wing nut 11.

FIGS. 10 to 12 further illustrate the pipe coupling clamp 1 shown in FIG. 9 being progressively closed, which closing occurs in exactly the same way as the pipe coupling clamp shown in FIGS. 1 to 4 is also closed.

With reference now to FIG. 13, there is shown the clamp of FIG. 12 again identified by the same reference numeral 1 with parts similar to those described already identified by the same reference numerals. As the wing nut 11 is tightened down the stepped threaded portion 17 it may, depending on the size of the pipes being coupled and the extent of tightening required, draw a portion of the eyebolt seating portion 16 up into the wing nut 11. Accordingly, as the wing nut 11 is tightened the internal threaded portion 51 of the bore of the wing nut 11 will similarly move down the stepped threaded portion 17, and in some instances, the widened portion 52 will seat on the top portion 54 of the eyebolt seating portion 16. The end 8 of the clamp half member 2 also comprises grooves 63 to snugly seat the nut 11 (see FIG. 9).

The invention is not limited to the embodiment hereinbefore described, but may be varied in both construction and detail within the scope of the claims.

The invention claimed is:

1. A pipe coupling clamp comprising:
   a pair of clamp half members substantially C-shaped in cross-section, each having a proximal end and a distal end;
   a pipe flange receiving groove located on each clamp half member for receiving the mating flanges of two pipes to be coupled;
   a hinge connecting the proximal ends of the clamp half members together;

a locking eyebolt and associated nut for releasably connecting the distal ends of the clamp halves together, a locking eyebolt hinge for pivotally connecting a proximal end of the locking eyebolt within an open support jaw on the distal end of one clamp half, the locking eyebolt comprising, at its proximal end, an elongate eyebolt seating portion which extends out of the open support jaw terminating in a stepped threaded portion of reduced diameter at its distal end, an eyebolt receiving slot connected to an open securing jaw located on the distal end of the other clamp half, the locking eyebolt configured to pivot through the receiving slot into the open securing jaw, the eyebolt receiving slot having a reduced size to receive the stepped threaded portion of the locking eyebolt, and the open securing jaw comprising an enlarged inner eyebolt receiving socket to snugly receive the eyebolt seating portion.

2. A clamp as claimed in claim 1, in which the locking eyebolt nut is a wing nut.

3. A clamp as claimed in claim 1, in which the elongate eyebolt seating portion is substantially the same size as the enlarged inner socket to provide a force fit between them.

4. A clamp as claimed in claim 1, further comprising a stop for preventing movement of the nut off the stepped threaded portion, which stop is secured to the free end of the stepped threaded portion of the locking eyebolt.

5. A clamp as claimed in claim 1, in which the nut comprises a bore having an internal threaded portion integrally connected to a widened portion of increased size, the internal threaded portion for engaging with the stepped threaded portion and the widened portion for engaging around a portion of the eyebolt seating portion.

6. A clamp as claimed in claim 1, further comprising a colour coding which identifies the medium flowing through the pipes coupled by the clamp.

7. A clamp as claimed in claim 6, in which the colour coding comprises a coloured plastic coating on nut wings and a stop.

8. A clamp as claimed in claim 1, in which the proximal ends of the clamp halves are hinged together by a connector plate pivotally mounted on each clamp half.

9. A clamp as claimed in claim 8, in which the spaced-apart connector plates are mounted by pivot pins in a spaced-apart manner, one being on each side of the clamp halves.

10. A pipe coupling clamp comprising:

a pair of clamp half members substantially C-shaped in cross-section, each having a proximal end and a distal end;

a pipe flange receiving groove located on each clamp half member for receiving the mating flanges of two pipes to be coupled;

a hinge connecting the proximal ends of the clamp half members together;

a locking eyebolt and associated locking eyebolt nut for releasably connecting the distal ends of the clamp halves together, a locking eyebolt hinge for pivotally connecting a proximal end of the locking eyebolt within an open support jaw on the distal end of one clamp half, the locking eyebolt comprising, at its proximal end, an elongate eyebolt seating portion which extends out of the open support jaw terminating in a stepped threaded portion of reduced diameter at its distal end, the nut having a bore with an internal threaded portion integrally connected to a widened portion of increased size, the internal threaded portion for engaging with the stepped threaded portion and the widened portion for engaging around a portion of the eyebolt seating portion, an eyebolt receiving slot connected to an open securing jaw located on the distal end of the other clamp half, the locking eyebolt configured to pivot through the receiving slot into the open securing jaw, the eyebolt receiving slot having a reduced size to receive the stepped threaded portion of the locking eyebolt, and the open securing jaw comprising an enlarged inner eyebolt receiving socket to snugly receive the eyebolt seating portion.

11. A clamp as claimed in claim 10, in which the locking eyebolt nut is a wing nut.

12. A clamp as claimed in claim 10, in which the elongate eyebolt seating portion is substantially the same size as the enlarged inner socket to provide a force fit between them.

13. A clamp as claimed in claim 10, further comprising a stop for preventing movement of the nut off the stepped threaded portion, which stop is secured to the free end of the stepped threaded portion of the locking eyebolt.

14. A clamp as claimed in claim 10, further comprising a colour coding which identifies the medium flowing through the pipes coupled by the clamp.

15. A clamp as claimed in claim 14, in which the colour coding comprises a coloured plastic coating on nut wings and a stop.

16. A clamp as claimed in claim 10, in which the proximal ends of the clamp half members are hinged together by a connector plate pivotally mounted on each clamp half member.

17. A clamp as claimed in claim 16, in which the spaced-apart connector plates are mounted by pivot pins in a spaced-apart manner, one being on each side of the clamp half members.

* * * * *